United States Patent [19]

Cross

[11] Patent Number: 4,975,137

[45] Date of Patent: Dec. 4, 1990

[54] METHOD OF MAKING A HINGED DISPLAY MOUNT

[76] Inventor: Carroll N. Cross, 3202 Holiday Ave., Apopka, Fla. 32703

[21] Appl. No.: 355,985

[22] Filed: May 22, 1989

[51] Int. Cl.[5] .............................................. B32B 31/18

[52] U.S. Cl. .................................... 156/223; 156/227; 156/256; 156/264; 156/265; 40/119; 40/120; 40/124.1; 40/124.4; 248/463; 281/30; 16/225

[58] Field of Search ............... 156/264, 265, 227, 223, 156/256; 40/119, 120, 124.1, 124.4; 248/463; 281/30; 16/225, 385

[56] References Cited

U.S. PATENT DOCUMENTS

| | | | |
|---|---|---|---|
| 1,845,952 | 2/1932 | Wright | 281/30 |
| 1,907,261 | 5/1933 | Shedd | 40/119 |
| 2,568,458 | 9/1951 | Nichols | 156/253 |
| 2,784,929 | 3/1957 | Diening | 248/463 |
| 3,002,720 | 10/1961 | Cross | 248/463 |
| 3,188,113 | 6/1965 | Cross | 281/30 |
| 3,198,339 | 8/1965 | Stolarz | 40/120 |
| 3,281,975 | 11/1966 | Simone | 40/120 |
| 3,713,578 | 1/1973 | Johnson | 16/225 |
| 4,299,643 | 11/1981 | Cross | 156/223 |

*Primary Examiner*—Caleb Weston

*Attorney, Agent, or Firm*—William M. Hobby, III

[57] ABSTRACT

A process of making a casebound hinged display mount having three rectangular panels and a pen holding slot formed in one edge of one of the rectangular panels for supporting the pen once the display mount has been set up. The process includes having a thin aluminum strip hinge with a visible groove in the case binding and aluminum strip hinge to make it easier to set up the display mount. The visible hinge line also allows the display mount to be shipped with a pen positioned in the visible groove and placed in the pen holding slot when the display mount is set up.

8 Claims, 2 Drawing Sheets

METHOD OF MAKING A HINGED DISPLAY MOUNT

BACKGROUND OF THE INVENTION

The present invention relates to display mounts and especially to a process of making a display mount having a pen holding slot formed in one of the panels and a ductile hinge preshaped with the laminating to leave a visible groove therein.

In the past, a great variety of displays for displaying calendars and the like have been provided. Typically, these display mounts are made of a paperboard panels which have a plurality of calendar leaves attached by staples, stitches, or placed in pockets on the display mount. The display may be provided with some means for supporting the display, such as having a rear hinged panel to hold the panels in position. These prior type displays are frequently provided free by companies to their customers and potential customers with their advertising material printed on the display mount. The present invention is directed toward a method of making a multi-use calendar display which may contain a pen or pencil holder using a panel with a U-shaped slot therein.

Typical display mounts for calendar pads and the like may be seen in my prior U.S. Pat. No. 2,355,706 for a display mount having a well in the face thereof for displaying materials such as calendar pads, and in U.S. Pat. No. 3,058,410 and U.S. Pat. No. 3,079,715 for an improved display mount structure and improved method for forming the display windows and display wells in display mount structures. In addition, my prior patents on displays and photomounts may be seen in U.S. Pat. Nos. 3,216,582; 3,068,139; and 3,002,720, which includes my patent on an aluminum hinge which allows a supporting prop or other display mount supports to be mounted with a flexible hinged panel which stays in place without the use of interconnecting tongues, or the like. Other display mount patents of mine include a Display Mount Apparatus and Method, U.S. Pat. No. 4,523,399; a Display Mount, U.S. Pat. No. 4,199,883; a Display Mount and Method, U.S. Pat. No. 4,351,123; a Display Mount with Protected Thermometer, U.S. Pat. No. 4,263,733; a Display Mount and Method, U.S. Pat. No. 4,326,906; a Method of Making a Display Mount, U.S. Pat. No. 4,285,683; and a Method of Making a Hinged Display Mount, U.S. Pat. No. 4,299,643. In my prior Patent for Display Book Apparatus, U.S. Pat. No. 4,288,935, I combined a display and book combination which allowed a calendar to swing forward to give access for a phone or reference book.

My U.S. Pat. No. 3,188,113 is for a Paper Holder with V-shaped pen receptacle, and has a display mount with pencil or pen holder formed therein but supported in a manner different from the present invention and requires five panels and supports the pens with a V-shaped pair of panels below the pen holding apertures.

In my prior U.S Pat. No. 4,299,643 for a METHOD OF MAKING A HINGED DISPLAY MOUNT a method of making a hinged display mount is shown of the type having a thin ductile hinge holding display panels in a predetermined position relative to each other and in which the hinge is preformed in a manner to overcome damage to the binding when folding the panels on the hinge.

In my prior U.S. Pat. No. 3,002,720, a display mount is shown attaching panels together with a thin strip of aluminum so that the panels once casebound can be folded into position without having additional supports for the mounts. The metal hinged items have been stored and shipped in a flat position at the factory and from the factory to customers.

SUMMARY OF THE INVENTION

A method of making a casebound hinged display mount includes the steps of forming first, second and third rectangular panels, then securing a thin ductile material, such as a thin strip of aluminum, along substantially parallel edges of the first and second rectangular panels to form a ductile hinge between two panels. Thin laminating or casebinding is formed on one side of the first second and third panels, over the ductile hinge and forming a flexible hinge between the second and third panels. A paper laminating cover may be formed on the other side of the first, second and third panels over the ductile and flexible hinges. The ductile hinge is preformed through the laminating and ductile hinge material to form a predetermined visible groove between the pair of panels so that a visible hinge line indicates the folding position between two panels and a casebound hinged display mount. Shaping is performed with a roller die during the process and two or more display mounts may be made simultaneously formed and die cut to form individual display mounts. A generally U-shaped slot is die cut in the top edge of the first rectangular panel and may be die cut while die cutting a plurality of laminated panels into individual display mounts for holding a pen in the slot when the display mount is set up for display. A pen of predetermined size can be placed in the visible groove formed in the display mount between the first and second panels with the third panel positioned thereover for shipping the pen and display mount together while maintaining a clear visible groove through the laminating.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
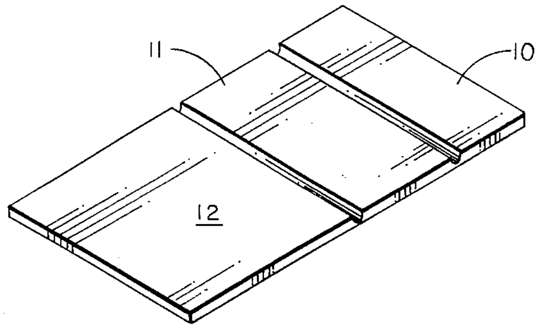
FIG. 1 shows a plurality of pairs of rectangular panels aligned in spaced relationship to each other.
Figure 2:
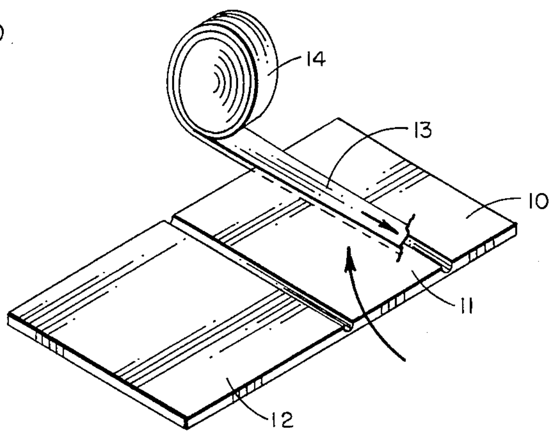
FIG. 2 is a perspective view of the panels of FIG. 1 having the ductile metal applied between two panels to form a ductile hinge.
Figure 3:
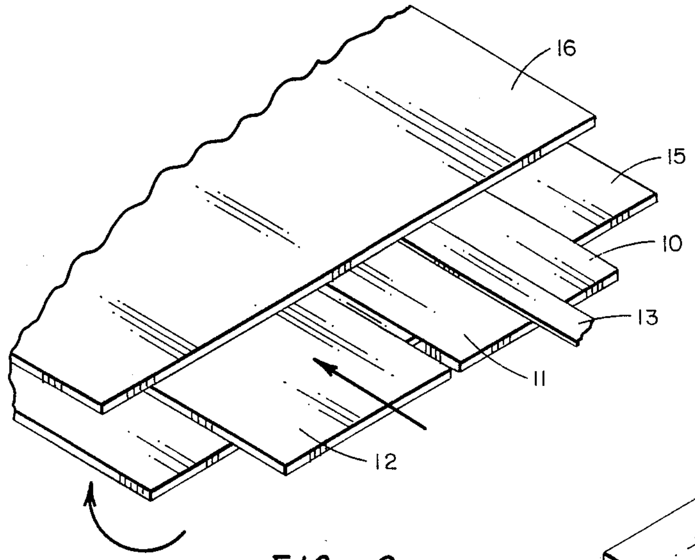
FIG. 3 is a perspective view showing the step of applying preprinted paper over the panels and over the metal hinge.

Referring to the drawings, a method of making a casebound hinge display mount in accordance with the present invention is illustrated in which FIG. 1 shows the three panels 10, 11 and 12 of paperboard or the like accurately spaced to form channels therebetween. In FIG. 2, the panels 10 and 11 have an aluminum or ductile metal strip 13 applied therebetween to form a ductile metal hinge. The ductile metal 13 is being fed from a roll 14. In FIG. 3 the panels 10, 11 and 12 with the aluminum strip 13 attached between panels 10 and 11 has the finished paper 15 lined on one side beneath the panels 10, 11 and 12 and a preprinted paper or casebinding material 16 applied to the top side of the panels 10, 11 and 12. The panels shown in FIGS. 1, 2 and 3 can, of course, be larger panels which are simultaneously coated with a preprinted paper over the aluminum hinges and then diecut to form two or more panels from the larger panel. Once the paper linings 15 and 16 have been attached over the panels 10, 11 and 12, they form a flexible hinge between panels 11 and 12 supported only by the paper 15 and 16 which has been attached to both sides thereof. The paper 15 and 16 is attached directly over the ductile metal hinge 13 which has been previously attached in FIG. 2. The entire panel is then diecut either as a single panel or as a multiple panel from a single sheet having the linings and hinges attached as in FIG. 4. The diecut panel 17 now has a pin slot 18 diecut therein along the edge of the panel 10. All four sides of the panels maybe diecut along with the slot 18 simultaneously.

Figure 4:
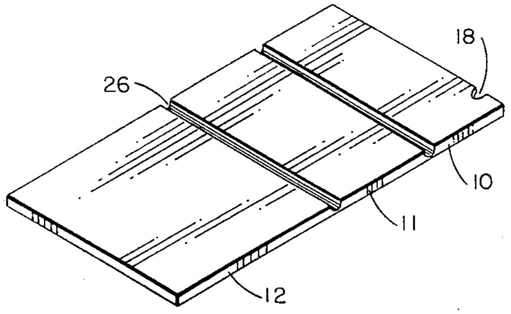
FIG. 4 is a perspective view of a display mount having the pen slot formed therein.
Figure 5:
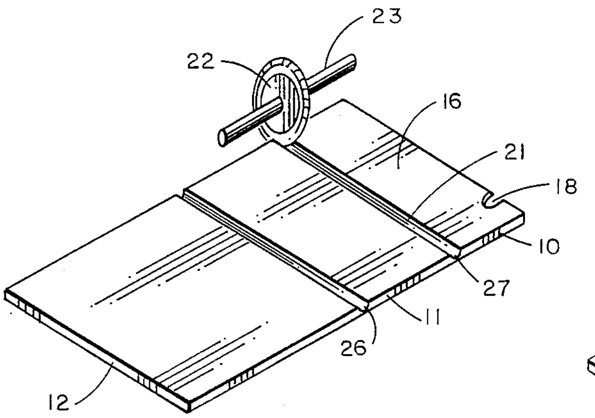
FIG. 5 is a perspective view of the casebound panel having a U-shaped groove formed therein through the laminating.

In FIG. 5, the display mount of FIG. 4 has a U-shape groove 21 formed in the ductile metal hinge through the binding 16 with a machine wheel 22 mounted to a roller shaft 23. This step takes place only after the binding or paper covering has been placed over the panels and over the metal hinge. This advantageously allows the ductile metal hinge to be readily identified and properly folded in a straight line without having the panel 10 slightly askew which tends to make the display mount off balance. Previously, the forming of a U-shape groove in a ductile metal hinge prior to laminating of covering the hinge helped in the proper folding of the hinge without breaking or cracking the ductile metal but the covered laminating tended to hide the groove so that the ultimate user could not tell where to fold the panels on the hinge.

Figure 6:
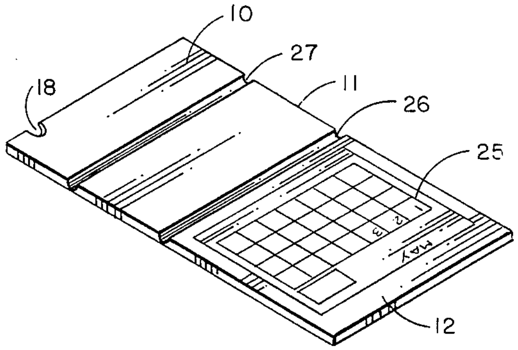
FIG. 6 is a perspective view of the display mount having the calendar attached to a third panel.

In FIG. 6, the finished display mount 24 has a calendar 25 mounted to the display panel 12 which has a flexible hinge 26 between the panel 12 and the panel 11 and a ductile hinge 27 casebound or covered thereover. The panel 10 has the pen slot cutout 18.

Figure 7:
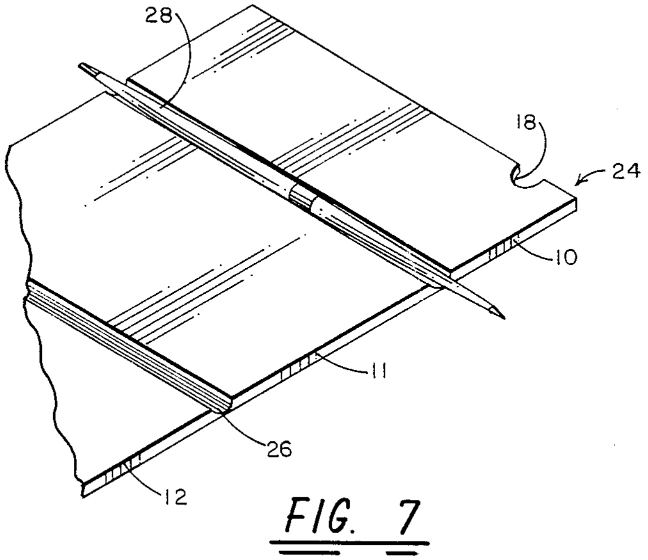
FIG. 7 is a partial perspective view of the display mount of FIG. 6 having a pen positioned in the U-shaped hinge slot.
Figure 8:
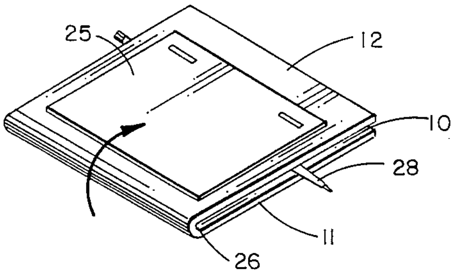
FIG. 8 is a perspective view of a display mount having a third panel folded over the other two panels and over the pen positioned in the U-shaped slot for shipping.
Figure 11:
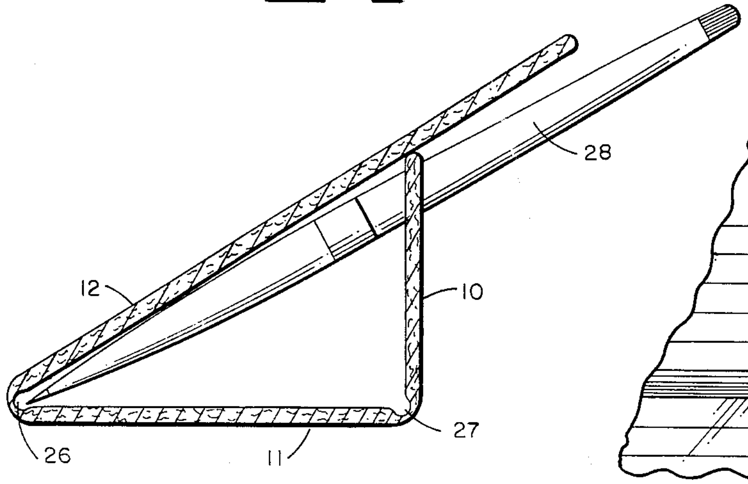
FIG. 11 is a side sectional view of a pen holder having a pen positioned therein.
Figure 12:
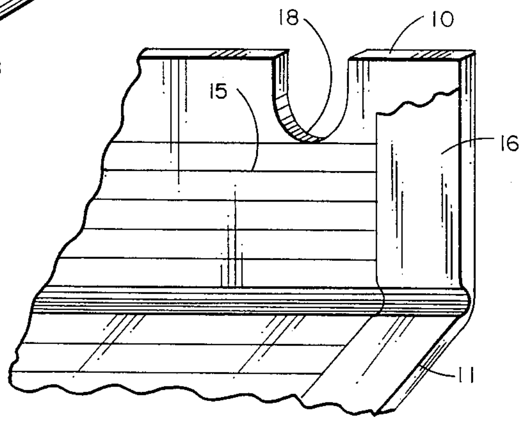
FIG. 12 is a perspective detail of the pen slot cutout through the laminating and panel board.

Turning to FIG. 7, the finished panel 24 has the pen slot 18 in the panel 10 with the flexible panel 26 connecting panels 11 and 12. A writing pen 28 is tubular shaped and exactly fits in the U-shaped groove 21 of the ductile hinge 27 for packing and protecting the pin during shipment while maintaining the integrity of the formed hinge. The display panel 12, having the calendar 25 thereon, can then be rotated on the hinge 26 as shown in FIG. 8 to hold the pen 28 in place in the groove 21 of the hinge 27 with the front rotated over onto the pen in a face-to-face relationship. With the base panel 11, the pen is covered and can be shipped in this manner complete with the pen.

Figure 9:
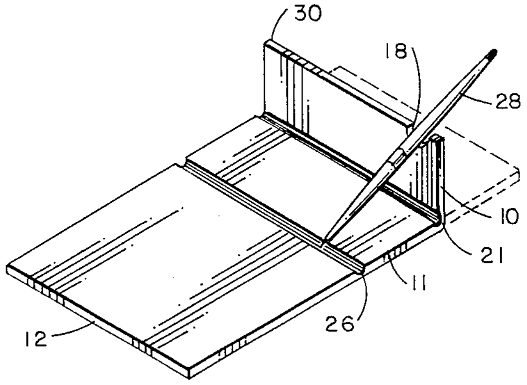
FIG. 9 is a perspective view of the set-up of the display mount in accordance with FIGS. 1–8 in which one hinge panel is folded on the hinge and the pen is placed in the pen slot.
Figure 10:
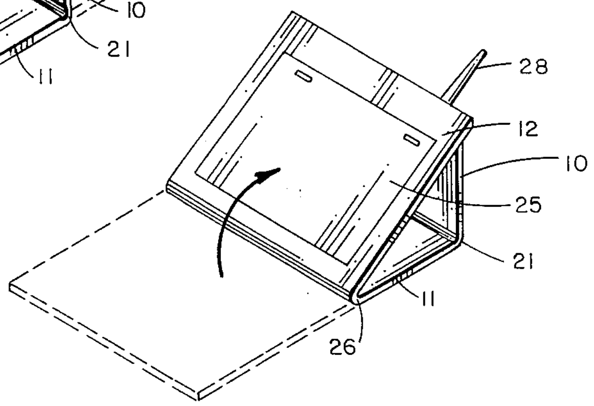
FIG. 10 is a perspective view of the display mount of FIG. 9 having the third panel folded over the pen to display the calendar.

The person receiving the calendar with pen can, as shown in FIG. 9, bend the panel 10 on the aluminum hinge 21 relative to the panel 11 and place the pen 28 in the pen slot 18. The pen slot 18 is deep enough to allow the barrel of the pen 28 to slide below the top edge 30 of the panel 10 with the pen, point protruding into the flexible hinge area 26 so that the panel 12 can be rotated over as shown in FIG. 10 to hold the pen 28 in place and display the calendar 25 at a desired angle. Advantageously, sheets of paper or envelope can be placed behind the panel 12 on top of the pen 28 and laying on the edge 30 of the upright support panel 10.

The basic method of making a casebound hinged display mount, then packing the display mount, and setting up the display mount by a recipient has been illustrated in FIGS. 1–10 and includes the basic steps of securing the thin ductile material or aluminum 13 along the inwardly disposed substantially parallel edges of the pair of rectangular panels 10 and 11 to form a ductile hinge therebetween. Then laminating one side of the pair of hinged panels over the ductile hinge with the laminating surface 16 and covering the other side of the panel 10 and 11 over the ductile hinge 27 with a paper or other thin material 15, then shaping the laminating 16 and ductile hinge material 13 secured to the rectangular panels 10 and 11 to form a predetermined visible groove 21 between the pair of panels so that a visible hinge line indicates the folding position between panels 10 and 11 through the casebound hinged display mount. The method also includes die-cutting the panels and the slot 18 simultaneously and the packing of the pen in the U-shaped slot formed through the laminating and ductile hinge with the display panel folded thereover for shipment so that preforming the hinge through the laminating or covering material which advantageously provides a means for shipping a pen therewith which makes the U-shaped groove 21 keep its shape during shipment while holding the pen.

It should be clear at this time that a display mount which eases the making, shipping and setting up of a display mount with a pen has been provided. However, the present invention is not to be construed as limited to the forms shown which are to be considered illustrative rather than restrictive.

I claim:

1. A method of making a laminated hinged display mount comprising the steps of:

forming first, second and third rectangular panels each panel having two sides and a plurality of edges;

securing a piece of thin ductile material along inwardly disposed substantially parallel edges of said first and second rectangular panels to form a ductile hinge therebetween;

laminating sheet material over one side of said first, second and third panels over said ductile hinge and over a predetermined space between the second and third panels to thereby form a flexible hinge between said second and third panels; and die cutting a generally U-shaped slot of predetermined size in one edge of said first rectangular panel for holding a pen therein when said display mount is set up for display, whereby a laminated hinges display mount has a pen holding slot formed therein.

2. The method in accordance with claim 1 including the step of shaping said piece of thin ductile material secured between said first and second rectangular panels to form a predetermined visible groove between said first and second panels, whereby a visible hinge line indicates the folding position between two panels in a casebound hinged display mount.

3. The method in accordance with claim 2 in which the step of shaping said thin piece of ductile material includes passing a roller die over said laminated thin sheet of material over said thin piece of ductile material.

4. The method in accordance with claim 3 including the step of die cutting a plurality of hinged rectangular panels from a larger panel and including the die cutting of a generally U-shaped slot in one edge of each first die cut panel.

5. The method in accordance with claim 4 including the step of placing a pen in said visible groove of said hinged first and second panels and folding said third panel thereover to thereby pack a pen with each display mount and maintain the visible groove therein.

6. The method in accordance with claim 5 including the step of attaching a calendar pad to one of said third panel for display when said display mount is set up.

7. The method in accordance with claim 6 in which the step of cutting said generally U-shaped slot in one edge of said first panel includes cutting a generally U-shaped slot in said first panel edge opposite said third rectangular panel whereby bending said first and second rectangular panels on said ductile hinge allows folding said third panel over the generally U-shaped slot whereby a pen can be held in said slot under said third rectangular panel and supported on the flexible hinge between said second and third panels.

8. The method in accordance with claim 7 in which said first, second and third panels are laminated over both sides thereof.

* * * * *

UNITED STATES PATENT AND TRADEMARK OFFICE
CERTIFICATE OF CORRECTION

PATENT NO. : 4,975,137

DATED : Dec. 4, 1990

INVENTOR(S) : Carroll N. Cross

It is certified that error appears in the above-identified patent and that said Letters Patent is hereby corrected as shown below:

Column 1, Claim 1, line 5, change "hinges" to --hinged--.

Signed and Sealed this

Twenty-eighth Day of April, 1992

*Attest:*

HARRY F. MANBECK, JR.

*Attesting Officer* *Commissioner of Patents and Trademarks*